United States Patent [19]

Barcomb et al.

[11] Patent Number: 4,880,538

[45] Date of Patent: Nov. 14, 1989

[54] EDGE SEAL FOR LIQUID FILTRATION APPARATUS

[75] Inventors: Lyle B. Barcomb, North Syracuse; Lawrence El-Hindi, Fabius, both of N.Y.

[73] Assignee: Filter Tech Inc., Manlius, N.Y.

[21] Appl. No.: 231,963

[22] Filed: Aug. 15, 1988

[51] Int. Cl.$^4$ .............................................. B01D 33/12
[52] U.S. Cl. .................................... 210/401; 210/387; 198/525; 198/836
[58] Field of Search ............... 210/387, 400, 401, 406, 210/526; 198/525, 836

[56] References Cited

U.S. PATENT DOCUMENTS

| | | | |
|---|---|---|---|
| 3,333,705 | 8/1967 | Lee | 210/387 |
| 3,876,547 | 4/1975 | Kaess | 210/387 |
| 4,137,169 | 1/1979 | El-Hindi | 210/406 |
| 4,201,675 | 5/1980 | Damerau | 210/401 |
| 4,220,539 | 9/1980 | Lee | 210/387 |

FOREIGN PATENT DOCUMENTS 0020101  12/1980  European Pat. Off. ............ 210/387

*Primary Examiner*—W. Gary Jones
*Assistant Examiner*—Matthew O. Savage
*Attorney, Agent, or Firm*—Charles S. McGuire

[57] ABSTRACT

A labyrinth seal incorporated in liquid filtration apparatus to prevent migration of unfiltered liquid carrying solid contaminants and air which may be entrapped in such liquid past the lateral edges of a filter media carried on an endless conveyor into an underlying chamber for receiving filtered liquid. The seal includes a pair of low friction strips and an underlying seal support fixedly attached in superposed relation along both interior sides of the tank and extending between positions where the conveyor enters and exits the unfiltered liquid. The seal further includes one layer in a first embodiment, and two, superposed layers in a second embodiment, of fluid-impervious material affixed to each lateral edge of the conveyor chain or belt about the entire periphery thereof, and movable therewith. The outermost lateral edge portions of the media are engaged and move slidingly between opposing surfaces of the stationary strips, as are edge portions of the upper movable layer in the second embodiment, and edge portions of the single (or lower) movable layer are engaged between the lower strip and upper surface of the seal support.

16 Claims, 3 Drawing Sheets

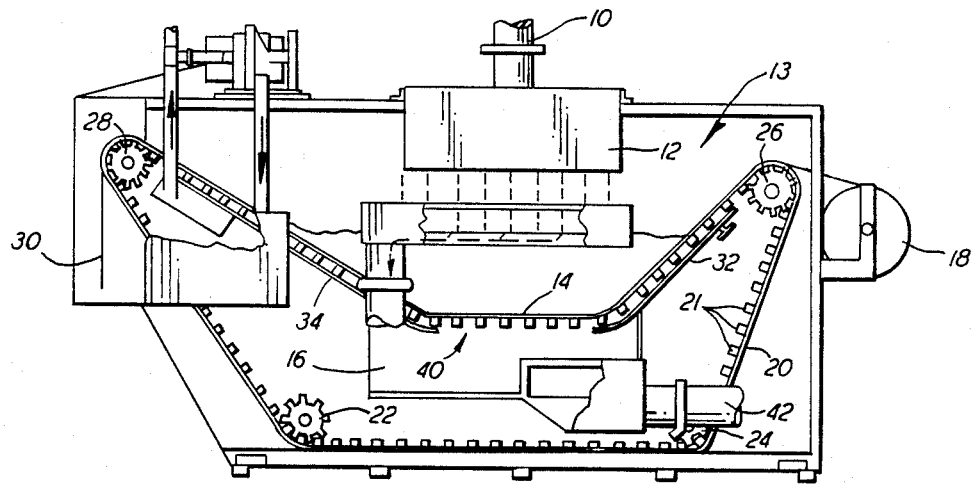
FIG. 1
FIG. 1A
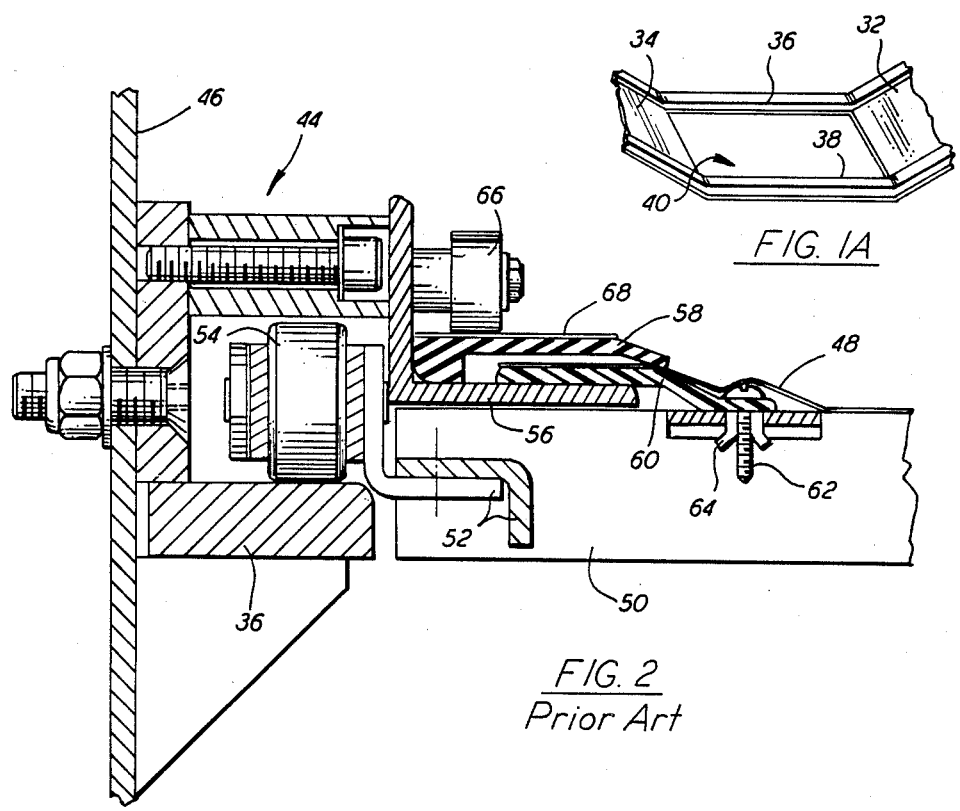
FIG. 2
Prior Art

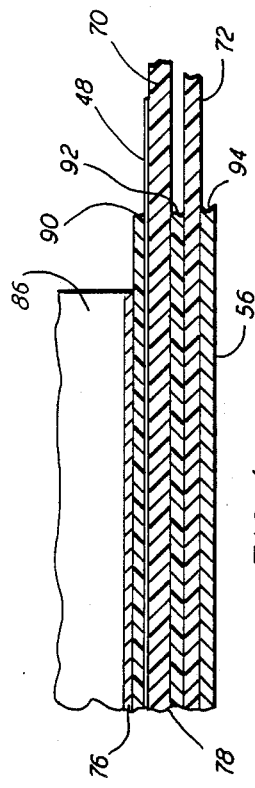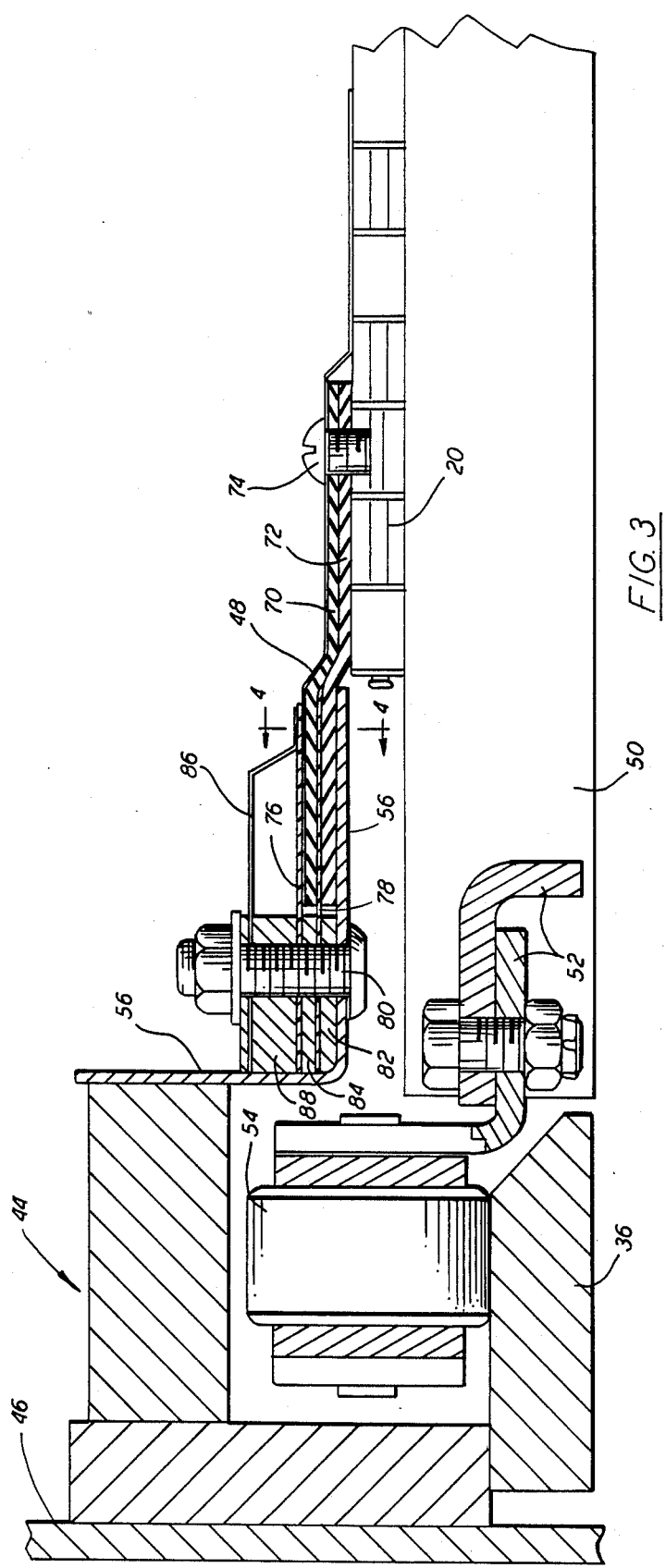

EDGE SEAL FOR LIQUID FILTRATION APPARATUS

BACKGROUND OF THE INVENTION

The present invention relates to liquid filtration apparatus and, more particularly, to structure providing an improved seal for preventing leakage past the sides of a moving filter media into an underlying liquid recovery compartment which is maintained at sub-atmospheric pressure.

Among the filtration systems commonly used to remove contaminants from liquids for recyling in machine tool operations are those employing endless chain conveyors which move through a tank to which contaminated liquid is supplied for filtration through a liquid-permeable filter media. Contaminants are deposited on the surface of the media as the liquid passes through, resulting in a bed or "cake" of contaminants which is removed either by scraping it from a stationary media by movable scraper elements, or by attaching the media to the movable conveyor belt which is continuously or periodically moved to position a fresh portion of media in the tank to perform the filtration operation.

The conveyor and media travel over an opening in the bottom of the tank beneath which is a chamber for collecting the filtered or "clean" liquid which is pumped back to the work area for reuse. Rather than relying upon an unacceptably slow rate of filtration provided by gravitational flow of the liquid through the media at a pressure differential due only to the head of liquid in the tank, the liquid collection chamber is maintained at sub-atmospheric pressure. In this way, the liquid is drawn through the media at a much faster rate without sacrificing filtration efficiency, assuming that an effective seal is provided along the edges of the media to prevent unfiltered liquid from migrating into the liquid collection chamber. U.S. Pat. No. 4,137,169, commonly owned with the present application, discloses filtration apparatus including means for effecting the aforementioned seal along the edges of the media. It has been found, however, that the seal provided by the apparatus disclosed in this patent, as well as other prior art sealing apparatus, is not always fully effective in preventing leakage along the sides of the media.

Accordingly, the principal object of the present invention is to provide liquid filtration having novel and improved means for preventing leakage of unfiltered liquid which may carry solid contaminants around the edges of a movable filter media into an underlying liquid collection chamber which is maintained at sub-atmospheric pressure.

A further object is to provide a novel and improved seal between stationary and movable portions of liquid filtration apparatus.

Other objects will in part be obvious and will in part appear hereinafter.

SUMMARY OF THE INVENTION

The invention is disclosed in two embodiments, each including conventional elements of liquid filtration apparatus including a tank for receiving contaminated liquid, a continuous conveyor carrying a liquid-permeable filter media on its upper run or reach, a chamber below the tank for receiving filtered liquid through the media and an opening through which the tank and chamber communicate. The space in the chamber above the level of filtered liquid therein is maintained at sub-atmospheric pressure, also in accordance with conventional practice. The invention is concerned with providing an effective seal along each edge of the opening through which the filtered liquid passes from the tank to the chamber, and includes both elements movable with the conveyer and elements fixedly attached to the tank walls.

The invention is disclosed in two embodiments, each including a pair of superposed strips of fluid-impervious material fixedly attached to and extending inwardly from both tank walls between first and second ends, respectively adjacent the positions where the conveyor enters and leaves the liquid in the tank. In one embodiment, a single layer of fluid-impervious material is affixed to each lateral edge of the conveyor belt or chain about the entire periphery thereof. The lateral edges of the filter media are positioned and move slidingly between the two fixed strips, and the impervious strips attached to the edges of the conveyor extend and move slidingly between the lower of the two fixed strips and a parallel surface of an underlying seal support.

In the other embodiment, two superposed strips of fluid-impervious material are affixed to both lateral edges of the movable conveyor. The lateral edges of both the filter media and the upper layer of impervious material on the conveyor are positioned and move slidingly between the two fixed strips on the tank wall; the lower of the two impervious layers attached to side edges of the conveyor each extend and move slidingly between the lower of the fixed, impervious strips and the underlying, fixed seal support. A stainless steel spring extends along the path of the fixed layers and includes an inwardly directed edge portion contacting the upper, fixed layer and urging all of the superimposed layers, including both fixed layers, both moveable layers and the lateral edge of the filter media, downwardly into firm contact with the underlying support. Also, the fixed layers are of a low friction material, such as the plastic material sold under the trademark TEFLON, so that the moveable layers and media edge can easily slide therebetween. As will be seen from the following detailed description, the arrangement provides a substantially enhanced seal between fixed and moving portions of liquid filtration apparatus to prevent leakage of air into a sub-atmospheric liquid collection chamber.

BRIEF DESCRIPTION OF THE DRAWINGS

FIG. 1 is a somewhat diagrammatic, side elevational view of filtration apparatus of the type wherein the invention is employed, the majority of the view being in vertical section through the center, and other portions being broken away;

FIG. 1a is a fragmentary, perspective view of a portion of the apparatus of FIG. 1;

FIG. 2 is an enlarged, fragmentary, front elevational view of a prior art edge seal arrangement previously used in apparatus such as that of FIG. 1;

FIG. 3 is an enlarged, fragmentary, sectional, front elevational view of a first embodiment of the edge seal arrangement of the present invention, for incorporation in apparatus such as that of FIG. 1;

FIG. 4 is a fragmentary, side elevational view of a portion of the seal arrangement of FIG. 3, in section on the line 4—4 thereof;

DETAILED DESCRIPTION

Figure 6:
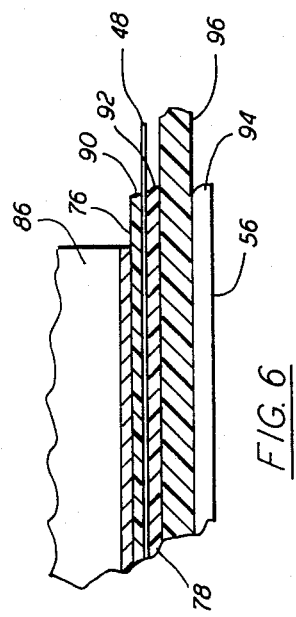
FIG. 6 is a fragmentary, side elevational view in section on the line 6—6 of FIG. 5.

Referring now to the drawings, in FIG. 1 is depicted a form of liquid filtration apparatus commonly used to separate foreign matter and other solids from a process liquid. The liquid and, if desired, the solids may then be recovered for reuse in the same or other processes. A common example, which is one of the principal intended uses of the invention, is the recovery of liquid used to cool and lubricate the work in metal drilling, grinding, shaping and other machining operations.

Contaminated liquid is delivered through inlet 10 to distribution chamber 12 and is deposited in the open, upper portion of tank 13 which is separated by horizontally disposed portion 14 of the liquid pervious filter media from liquid collection chamber 16. In the form illustrated, the filter media is of the disposable type, supplied from continuous roll 18 for positioning on the upper reach of an endless conveyor including an open mesh belt or chain 20, of conventional design, carried by spaced carrier bars 21. The conveyor passes over idler sprockets 22, 24 and 26 and drive sprocket 28, being moveable by the latter in a counterclockwise direction as shown in FIG. 1. Upon leaving the upper reach of the conveyor, the media is disposed of, as indicated by the portion denoted by reference numeral 30.

The structure supporting the upper reach of the conveyor 20 is shown in FIG. 1a. Solid, planar portions 32 and 34 form inclined ramps underlying chain 20 and bars 21 as the conveyor enters and exits the fluid-filled upper portion of tank 13. Side tracks 36 and 38 support the rollers upon which the conveyor travels at each side of portions 32 and 34, and extend horizontally therebetween to form central opening 40, through which tank 13 communicators with liquid collection chamber 16 for passage of filtered liquid into the latter. Any solids in the form of metal chips, turnings, etc. carried to tank 13 by the process liquid, as well as any other solid foreign matter, is retained on the surface of the filter media as the liquid passes through the media to chamber 16, from which it is pumped through outlet 42.

Referring now to FIG. 2, the edge seal mechanism of the prior art, as exemplified by aforementioned U.S. Pat. No. 4,137,169 is shown in enlarged section. A heavy duty support assembly, of which track 36 forms a part, is indicated generally by reference numeral 44, and is fixedly attached to side wall 46 of tank 13. A lateral edge portion of the liquid pervious media is denoted by reference numeral 48. An end portion 50 of one of carrier bars 21 is seen to be attached by brackets 52 to a carrier chain comprising a succession of link-connected rollers 54 which travel over track 36. An L-shaped seal guide 56 is fixedly attached to support assembly 44 and carries edge protector or stationary seal 58, of PVC or similar material.

Movable carrier belt seal 60, a continuous strip of polyester or other liquid and air impervious material, is attached by screws 62 and nylon retainers 64 to end portions 50 of carrier bars 21. Media edge portion 48 extends over the upper surface of seal 60 on the upper reach of the conveyor, the media being physically unattached to either the seal or the carrier bars. Movable seal 60 and media edge 48 travel between stationary seal 58 and seal guide 56. Seal 58 is biased downwardly to urge the inner edge thereof into firm engagement with media edge portion 48 by hold down cam 66 and retainer strip 68. In this manner, the edge sealing structure of the prior art was intended to prevent the leakage of unfiltered liquids around the edges of the media and its supporting structure into the underlying liquid collection chamber.

Although edge sealing means such as that of FIG. 2 provided results far superior to those previously available, some degree of "unavoidable" leakage into the liquid collection chamber still occurred, particularly at high pressure differentials across the media. The improved edge seal structure of the present invention, exemplified by the showing of FIGS. 3-6, essentially eliminates all such leakage in this type of liquid filtration apparatus. In addition, the edge seal elements of the present invention are easier to replace than those of the prior art.

Elements such as track 36, support assembly 44, tank wall 46, media edge 48, carrier bar end 50, brackets 52, rollers 54 and seal guide 56 are essentially the same as the corresponding elements of the prior art embodiment of FIG. 2, and are therefore indicated by the same reference numerals. Media support chain 20 is shown in FIGS. 3 and 5 of a type used for many years in liquid filtration conveyor systems, including those having edge seal structure such as that of FIG. 2.

Referring now to FIGS. 3 and 4, upper and lower movable seal strips 70 and 72, respectively, of liquid fluid impervious material, are superposed and commonly affixed to chain 20 by screw 74. Media edge 48 is physically unattached to any other structure, as before, and extends over the upper surface of movable seal strip 70. Upper and lower stationary seal strips 76 and 78, respectively, are fixedly mounted by bolt 80 upon seal guide 56, and are constructed of fluid impervious material having a low-friction surface, such as the plastic material sold under the trademark TEFLON. Lower stationary seal 78 is separated from seal guide 56 by spacer element 82, and the upper and lower stationary seals are separated from one another by spacer element 84.

In operation, as the upper reach of the conveyor moves through tank 13, upper movable seal strip 70 and the outermost portion of media marginal edge 48 move slidingly between upper and lower stationary seal strips 76 and 78. Lower movable seal strip 72 moves in the same manner between the lower surface of lower stationary seal strip 78 and the substantially parallel, upper surface of seal support 56. The stationary seal strips are somewhat flexible at their unsupported edges, which are urged into firm engagement with the movable seal strips and media edge by stainless steel spring 86 which is also retained by bolt 80 and separated from upper stationary seal strip 76 by spacer element 88. It will be understood that the movable seal strips are attached to both lateral edges of the movable, endless conveyor about the entire periphery thereof, and that the stationary seal strips, as well as spring 86 extend along both side walls of tank 13 adjacent the upper reach of the conveyor from a position above the entry of the conveyor into the liquid being filtered to a position above exit of the conveyor from the liquid. The elements of the edge seal are shown in FIG. 4 at the position above the entry of the conveyor into the liquid within tank 13. Terminal edges 90 and 92 of stationary seal strips 76 and 78, respectively, as well as edge 94 of seal support 56 are preferably rounded or beveled, as shown, to prevent binding or snagging as the media and movable seal strips enter the areas between the stationary seal strips and support.

Figure 5:
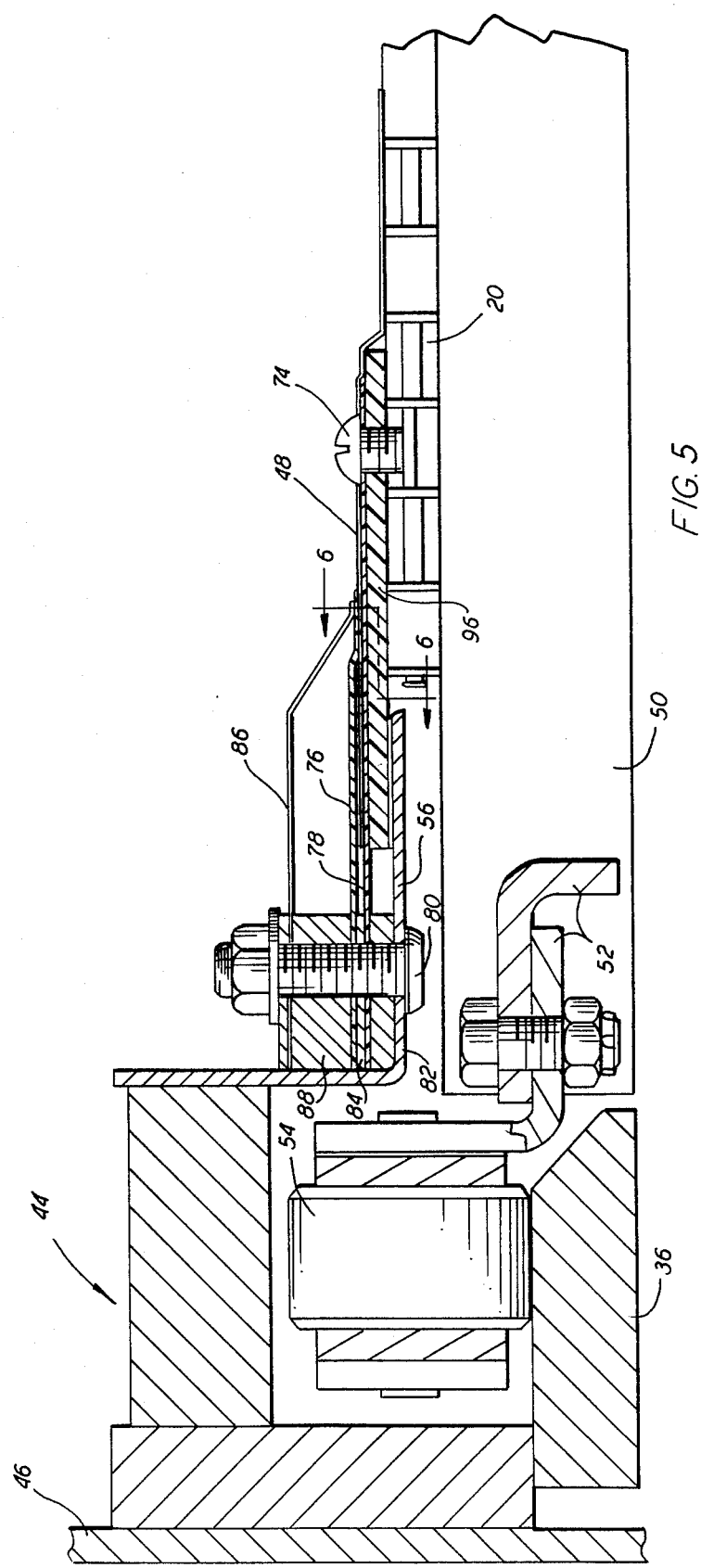
FIG. 5 is an enlarged, fragmentary, sectional, front elevational view of a second embodiment of the invention.

A somewhat simplified embodiment of the edge seal structure is shown in FIGS. 5 and 6. All elements common to the embodiment of FIGS. 3 and 4 are denoted by the same reference numerals, and include the two stationary seal strips 76 and 78. In fact, the only significant structural difference between this and the previously described embodiment is that only one layer of fluid-impervious material, denoted by reference numeral 96, is provided. Lateral media edge 48 is positioned and moves slidingly between upper and lower stationary seal strips 76 and 78, while layer or strip 96 is engaged between lower stationary seal strip 78 and seal support 56. In both embodiments, the labyrinth seal provides the same path which must be followed by any solid contaminants in order to pass from tank 13 into chamber 16, i.e., betwen strip 76 and media edge 48, between media 48 (or layer 70) and strip 78, between strip 78 and layer 72 (or 96), and between layer 72 (or 96) and seal support 56.

What is claimed is:

1. In a liquid filtration apparatus having a tank for receiving liquid carrying solid contaminants and having parallel side walls, a continuous conveyor having an upper reach carrying a liquid-permeable media having lateral edges, said upper reach being positioned within and movable through the liquid in said tank, and a chamber below said tank and communicating therewith through an opening to receive filtered liquid passing through said media and said opening, edge seal means providing an essentially fluid-tight seal along each lateral edge of said upper reach to prevent leakage of unfiltered liquid from said tank through said opening and into said chamber, said edge seal means comprising:
   (a) a pair of substantially flat, superposed, upper and lower strips of fluid-impervious material fixedly attached to the interior of said tank on both sides thereof and extending inwardly, substantially parallel to and spaced from one another, said strips each having first and second terminal ends positioned above the level of liquid in said tank adjacent the positions at which said upper reach enters and exits, respectively, said liquid;
   (b) a rigid seal support fixedly attached to the interior of said tank on both sides thereof and extending inwardly with an upper surface parallel to and underlying said lower strip;
   (c) a layer of fluid-impervious material affixed to each lateral edge of said conveyor about the entire periphery of said conveyor for movement therewith;
   (d) the outermost portions of each lateral edge of said media being positioned between opposing surfaces of said upper and lower strips on both sides of said tank for sliding movement between said first and second terminal ends thereof; and
   (e) the outermost portions of the lateral edges of said layer affixed to each of said conveyor lateral edges being positioned between opposing surfaces of said lower strip and said seal support on both sides of said tank for sliding movement between said first and second ends thereof.

2. The invention according to claim 1 wherein said pair of strips are constructed of an elastomer having low-friction surfaces.

3. The invention according to claim 2 wherein said strips are of substantially equal length and width, having superposed, inner and outer, longitudinal edges.

4. The invention according to claim 3 wherein said strips are fixedly attached to the interior of said tank in spaced relation to one another adjacent outer, longitudinal edges.

5. The invention according to claim 1 wherein said upper and lower strips are fixedly attached to said seal support in spaced relation to one another and to said seal support upper surface.

6. The invention according to claim 5 wherein said seal support comprises an L-shaped member having a lower leg to which said strips are bolted and which includes said upper surface.

7. The invention according to claim 6 and further including a spring member fixedly supported adjacent an outer edge in superposed relation to said upper and lower strips and said lower leg of said seal support and extending substantially between said first and second terminal ends of said strips, said spring member including an inner edge engaging said upper strip and biasing inner edges of said upper and lower strips downwardly toward said seal support.

8. The invention according to claim 7 wherein said spring is bolted to said lower leg of said seal support.

9. The invention according to claim 1 wherein said edge seal means comprises a pair of layers of fluid-impervious material affixed to each of said conveyor lateral edges about the entire periphery of said conveyor for movement therewith, said pair of layers being superposed with one another in upper and lower layers with said lateral edges of said media overlying said upper layer.

10. The invention according to claim 9 wherein the outermost portions of both said media and said upper layer are positioned between opposing surfaces of said upper and lower strips on both sides of said tank for sliding movement between said first and second terminal ends thereof, and the outermost portions of the lateral edges of said lower layer are positioned between opposing surfaces of said lower strip and said seal support on both sides of said tank for sliding movement between said first and second terminal ends thereof.

11. The invention according to claim 10 wherein said strips are of substantially equal length and width, having superposed, inner and outer, longitudinal edges.

12. The invention according to claim 11 wherein said layers are of substantially the same width, having superposed, inner and outer, longitudinal edges.

13. The invention according to claim 12 wherein said upper and lower strips are fixedly attached to said seal support in spaced relation to one another and to said seal support upper surface.

14. The invention according to claim 12 wherein said seal support comprises an L-shaped member having a lower leg which includes said seal support upper surface, said strips being bolted to said lower leg in superposed relation to said seal support upper surface.

15. The invention according to claim 14 and further including a spring member fixedly supported adjacent an outer edge in superposed relation to said upper and lower strips and said lower leg of said seal support and extending substantially between said first and second terminal ends of said strips, said spring member including an inner edge engaging said upper strip and biasing inner edges of said upper and lower strips downwardly toward said seal support.

16. The invention according to claim 15 wherein said spring is bolted to said lower leg of said seal support in superposed relation to said first surface and to said strips.

* * * * *